US005930702A

United States Patent [19]
Goldman et al.

[11] Patent Number: 5,930,702
[45] Date of Patent: Jul. 27, 1999

[54] PERSONAL MOBILITY COMMUNICATION SYSTEM

[75] Inventors: Shelley B. Goldman, East Brunswick; David Phillip Silverman, Somerville; Roy Philip Weber, Bridgewater, all of N.J.

[73] Assignee: AT&T Corp., Middletown, N.J.

[21] Appl. No.: 08/735,287

[22] Filed: Oct. 22, 1996

[51] Int. Cl.[6] .............................. H04M 3/54; H04Q 7/38
[52] U.S. Cl. ................ 455/417; 379/211; 348/9
[58] Field of Search ........................... 455/417; 379/210, 379/211; 348/9

[56] References Cited

U.S. PATENT DOCUMENTS

5,260,778  11/1993  Kauffman et al. ........................ 348/9
5,610,970  3/1997  Fuller et al. ............................. 455/417

Primary Examiner—Andrew M. Dollnar

[57] ABSTRACT

The invention provides a mobile communication system in a network that receives a location schedule from a subscriber and directs a call to the subscriber based on the location schedule. The network may include a telephone network, a data network and a cable network interconnected together. Each of the networks connects to communication devices. For example, the cable network is connected to fixed location devices such as cable units conventionally provided to cable subscribers. The fixed location devices may be connected to communication devices such as televisions, stereos or mailboxes. When a subscriber location schedule indicates that the subscriber is reachable at a specific fixed location device, the mobility system pages the subscriber at the specific fixed location device when a call is received for the subscriber during the specified date and time found in the location schedule. The subscriber may respond to the page by either making a reverting call commonly used in paging systems or responding directly through the fixed location device if the connected communication device provides for two-way communication.

16 Claims, 6 Drawing Sheets

PERSONAL MOBILITY COMMUNICATION SYSTEM

BACKGROUND OF THE INVENTION

1. Field of the Invention

This invention relates to mobile personal communications using a communication network.

2. Description of Related Art

Conventional communication systems such as pagers or cellular phones provide the ability to reach subscribers without restrictions to fixed locations. However, subscribers can only be reached within hearing distance of the pagers or cellular phones. For this reason, pagers or cellular phones are often either worn or carried by the subscriber. Thus, there is a need to provide a mobile personal communication system that does not require subscribers to wear or carry a communication device.

SUMMARY OF THE INVENTION

The invention provides a mobile communication system that receives a location schedule from a subscriber and directs a call to the subscriber based on the location schedule. The location schedule is a list of dates, times and addresses where the subscriber may be reached. An address identifies a device such as a fixed location device that is connected to a network which is also connected to the mobility system. The address may identify other communication devices such as telephone stations or personal computers.

The network may include a telephone network, a data network and a cable network interconnected together. The cable network is connected to cable boxes such as cable units conventionally provided to cable subscribers. The cable boxes may serve as fixed location devices that are connected to communication devices such as a television, a stereo or a mailbox. When a subscriber location schedule indicates that the subscriber is reachable at a specific fixed location device for a specific date and time, the mobility system pages the subscriber through the specified fixed location device when a call is received for the subscriber during the specified date and time found in the location schedule. The subscriber may respond to the page by either making a reverting call commonly used in paging systems or responding directly through the fixed location device if the connected communication device provides for two-way communication.

The mobility system includes at least one mobility unit. Each of the at least one mobility unit includes a controller, a memory and a network interface. The controller receives calls directed to the subscriber and routes the call to the subscriber or pages the subscriber based on the subscribers location schedule. The location schedule is stored in the memory by the subscriber. The subscriber may load the location schedule either by methods such as calling the mobility system, uploading the location schedule through a terminal such as a personal computer or entering the location schedule through a communication device connected through a fixed location device.

BRIEF DESCRIPTION OF THE DRAWINGS

The invention is described in detail with reference to the following drawings wherein like numerals represent like elements.

DETAILED DESCRIPTION OF THE PREFERRED EMBODIMENTS

Figure 1:
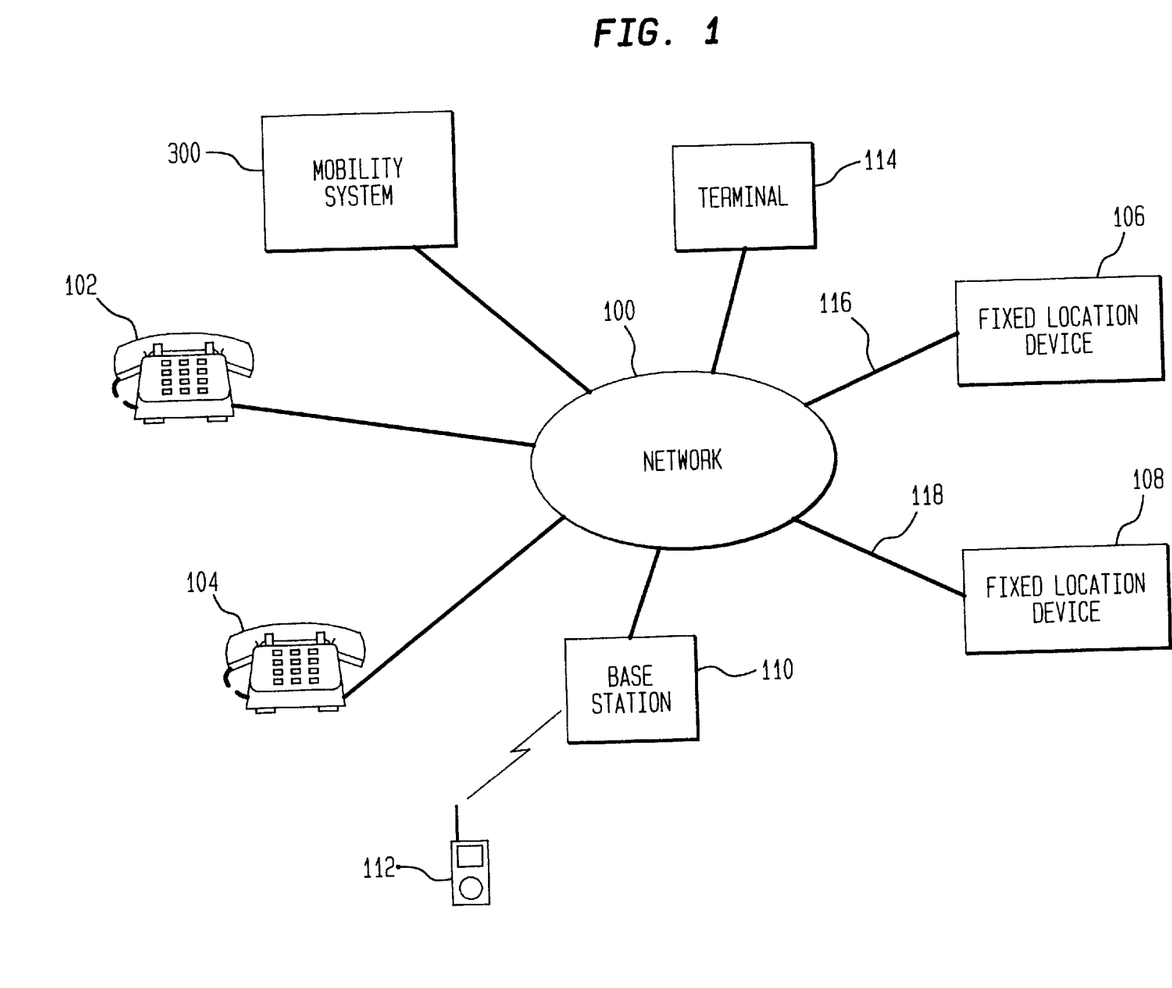
FIG. 1 is a diagram of a communication network including a mobility system.

FIG. 1 shows a diagram of a communication system including a network 100 and a mobility system unit 300 connected to the network 100. The network 100 interconnects many communication devices such as telephone stations 102 and 104, a terminal 114, fixed location devices 106 and 108 and a base station 110 that provides wireless communication with mobile devices such as a pager or cellular phone 112.

The mobility system unit 300 supports a mobility service for subscribers. When a subscriber travels to a distant location and is reachable through the fixed location device 106 for example, the subscriber may update a location schedule in a database in the mobility system unit 300. When a calling party calls the subscriber by dialing a number corresponding to the subscriber's telephone station 102 for example, the mobility system unit 300 receives the call and either routes the call to, or pages the subscriber at the fixed location device 106 where the subscriber can be reached. The calling party may of course call the subscriber via a cellular phone such as the cellular phone 112, or via a terminal (a personal computer) such as the terminal 114.

When the mobility system unit 300 reaches the subscriber, the subscriber may respond in two ways. The subscriber may dial a preassigned number in a reverting call and be connected to the calling party through a meet-me system similar to a conventional paging system. Alternatively, if the fixed location device 106 supports two-way communication, the subscriber may respond to the calling party directly through the fixed location device 106.

Figure 2:
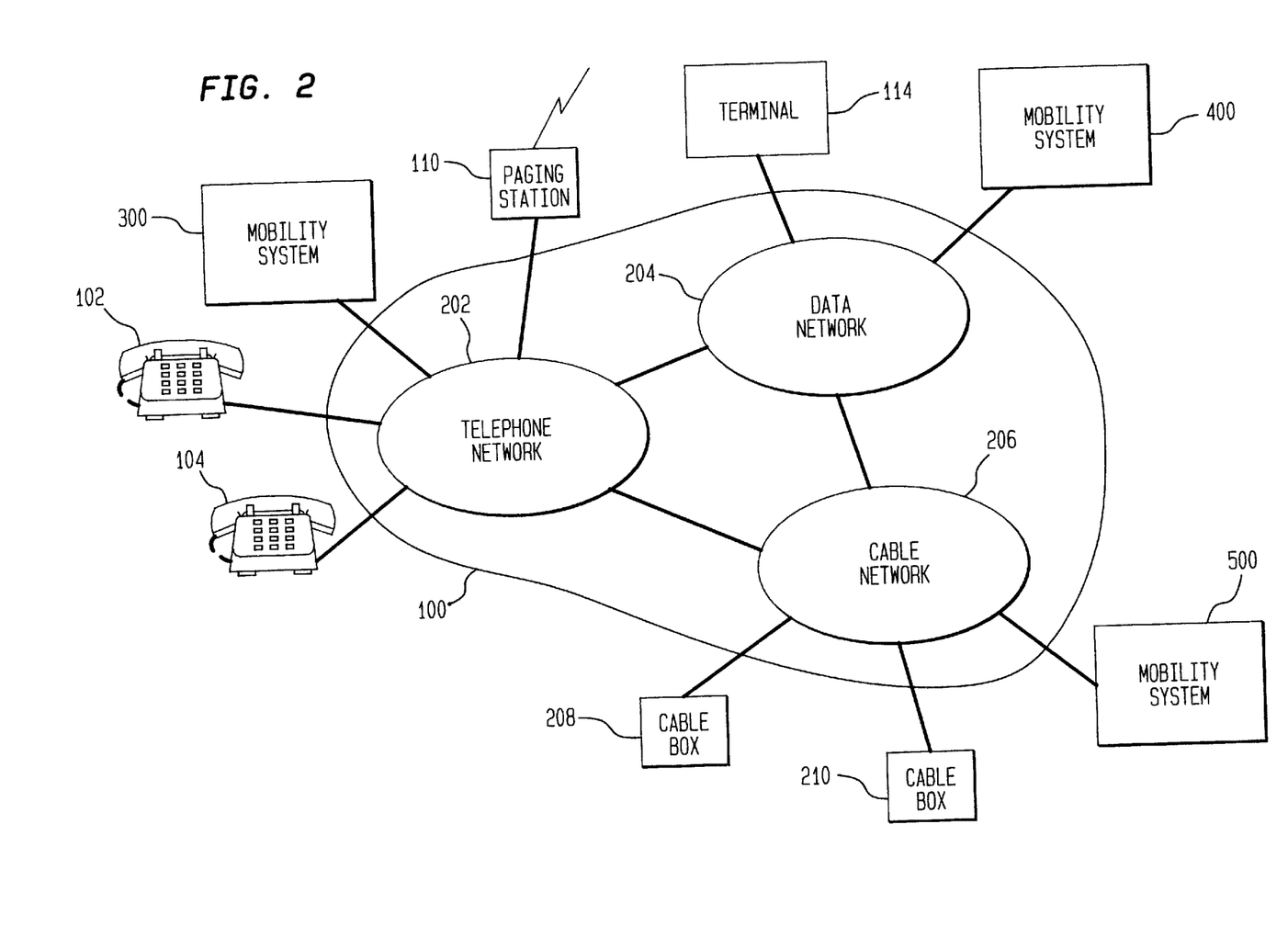
FIG. 2 is a more detailed diagram of the network shown in FIG. 1.

The network 100 may include several networks connected together such as a telephone network 202, a data network 204 and a cable network 206, as shown in FIG. 2. Telephone stations 102 and 104, the mobility system unit 300 and the base station 110 may be connected to the telephone network 202. The terminal 114 such as a personal computer and another mobility system unit 400 may be connected to the data network 204. The data network 204 may be the internet for example. The cable network 206 may be connected to cable boxes 208 and 210 and a third mobility system unit 500. The mobility system units 300, 400 and 500 together form a mobility system. The cable boxes 208 and 210 or the terminal 114 may serve as fixed location devices 106 and 108 for example. The mobility system provides subscribers in any of the three separate networks 202, 204 and 206 the ability to enter a location schedule so that they may be reached when they are at locations not reachable through their respective telephone stations, terminals telephone stations or cellular phones.

In addition, the mobility system may be configured in either a distributed or a central manner as shown in FIGS. 2 and 1, respectively. The exact mobility system configuration depends on cost, efficiency, etc. When configured in the distributive manner, the mobility system may be further distributed by coupling a mobility system unit with a local exchange carrier (not shown) or integrating the functions of the mobility system with the functions of equipment such as the local exchange carriers.

The location schedule is a list containing information such as date, time and an address where the subscriber may be reached. The address may identify a fixed location device 106 and 108 that are connected to the network 100 as well as telephone stations such as telephone stations 102 and 104 or fixed terminals such as terminal 114. The subscriber may enter or revise the list by calling a special number using the telephone station 102 for example. Alternatively, the subscriber may upload the location schedule or a revision of the location schedule using a terminal such as a personal computer for example.

If the subscriber has a two-way pager, the subscriber may enter an address through the pager and the mobility system automatically updates or creates a location schedule indicating that the subscriber is at the entered address. The subscriber may, of course, enter additional information such as date and time through the pager as discussed above. When one of the mobility system units 300, 400 and 500 receives a location schedule, the mobility system units 300, 400 and 500 inter-communicate so that when a calling party calls the subscriber via any device connected to the network 100, the mobility system can reach the subscriber appropriately.

The cable boxes 208 and 210 are similar to the cable units currently provided to homeowners for outputting entertainment information through devices such as a television. The cable boxes 208 and 210 may be provided with multiple channels so that separate independent communications may be achieved. A portion of the channels may be dedicated to the mobility system. If the devices connected to a cable box 208 for example provide only output capabilities, then the mobility system can only provide one-way communication having only the capability to output a signal such as a page to the subscriber. If a device connected to the cable box 208 provides two-way communication, i.e., for both input and output of information, then the mobility system can provide two-way communication and can connect calling and called parties together through the two-way communication device.

Conventional televisions are examples of a one-way device. When the mobility system pages a subscriber through a television, the connected fixed location device 106, for example, may open an overlay window on the television screen indicating that a page for the subscriber has been received. The fixed location device 106 may also generate a paging sound to alert the subscriber of the received page.

If a touch sensitive screen or a microphone is integrated with the television, then this enhanced television becomes a two-way device. Such a two-way device permits the subscriber to respond to the page by entering information via the touch sensitive screen or by voice communication through the microphone. Thus, the calling party and the subscriber may be connected without any further need for the subscriber to make a reverting call for example.

Two-way communication may also be possible via personal computers, mailbox machines equipped with microphones or stereo equipment similarly equipped. Thus, the mobility system provides a technology to reach a subscriber via any communication device, one-way or two-way, connected to a fixed location device 106.

Figure 3:
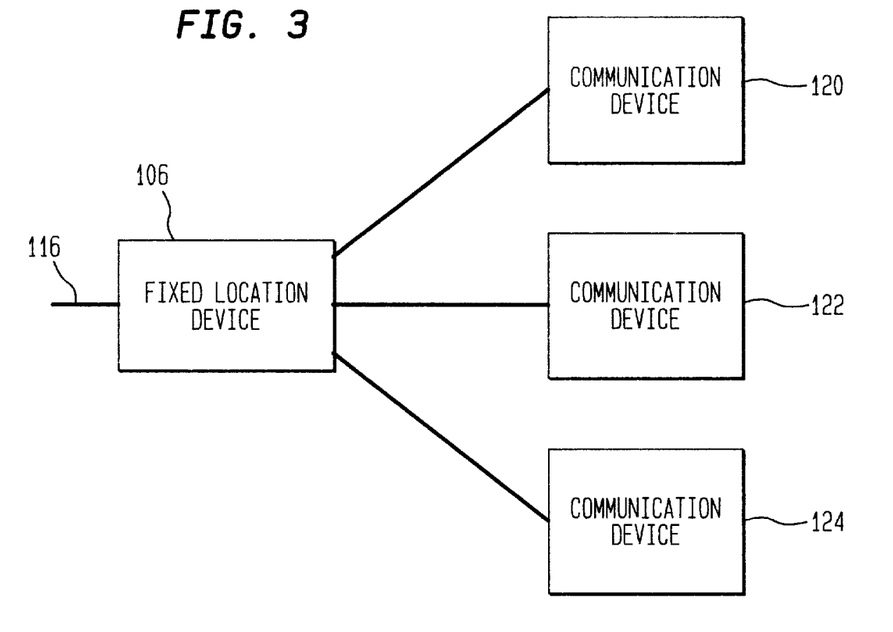
FIG. 3 is a diagram of communication devices connected to a fixed location device shown in FIG. 1.

FIG. 3 shows the fixed location device 106 connected to three communication devices 120, 122 and 124. The communication devices 120, 122 and 124 may be devices such as televisions, stereos, home security systems or mailboxes. The mobility system may communicate with the fixed location device 106 to obtain configuration information so that the number and type of communication devices available through the fixed location device 106 may be determined. The mobility system may select one or more of the communication devices based on predetermined criteria such as whether a communication device is turned on or subscriber designated preferred communication devices such as a mailbox.

Figure 4:
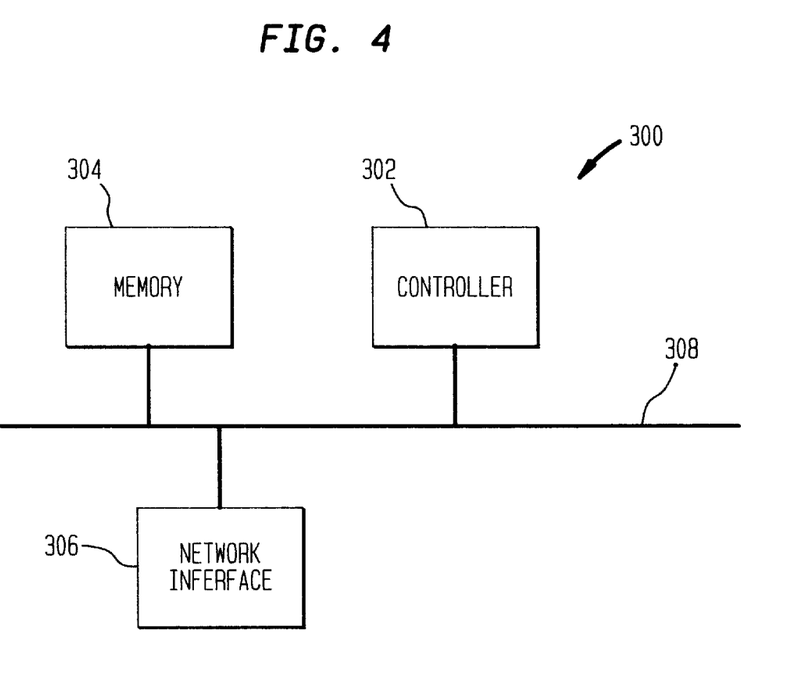
FIG. 4 is a block diagram of the mobility system shown in FIG. 1.

FIG. 4 shows a block diagram of the mobility system unit 300. The mobility system unit 300 includes a controller 302, a memory 304 and a network interface 306. The above components are coupled together through a bus 308. The mobility system units 400 and 500 are similar in function to the mobility system unit 300. The differences are related to the technical details of each respective network connected to a particular mobility system unit. Thus, the following description of the mobility system unit 300 is also applicable to the mobility system units 400 and 500.

When a subscriber calls the mobility system unit 300 to enter a location schedule, the controller 302 answers the call through the network interface 306 and receives the location schedule from the subscriber. The controller 302 searches the memory 304 and locates a database that corresponds to the subscriber and enters the location schedule in the database and stores the database in the memory 304. If a database is not found for the calling subscriber, then the mobility system creates a database and stores the location schedule in the database.

When a calling party calls the subscriber, the controller 302 receives the call through the network interface 306 and retrieves the location schedule of the subscriber from the memory 304 based on the number dialed by the calling party to determine where the subscriber may be reached. If the subscriber indicates "home", for example, or an entry for the particular time and date is not found, the mobile system routes the calling party to a device such as a telephone station identified by the number dialed by the calling party. However, if the subscriber has indicated a location other than the "home" location, the mobile system pages the subscriber at the location indicated by the location schedule.

If the fixed location device 106, for example, is reached and it is connected only to a one-way device, then the mobile system waits for a predetermined amount of time for the subscriber to respond via a reverting call. If the reverting call is detected, the mobile system routes the calling party and the subscriber together by conventional methods such as methods used by conventional paging systems. If after the predetermined amount of time has passed and the subscriber has failed to respond to the mobile system paged, then the mobile system offers the calling party available features subscribed to by the subscriber such as an electronic mailbox and then, after the selected feature is completed, ends the call.

If the fixed location device 106 reached by the mobile system is connected to a two-way device, the subscriber may answer the page directly through the two-way device and communicate with the calling party.

Figure 5:
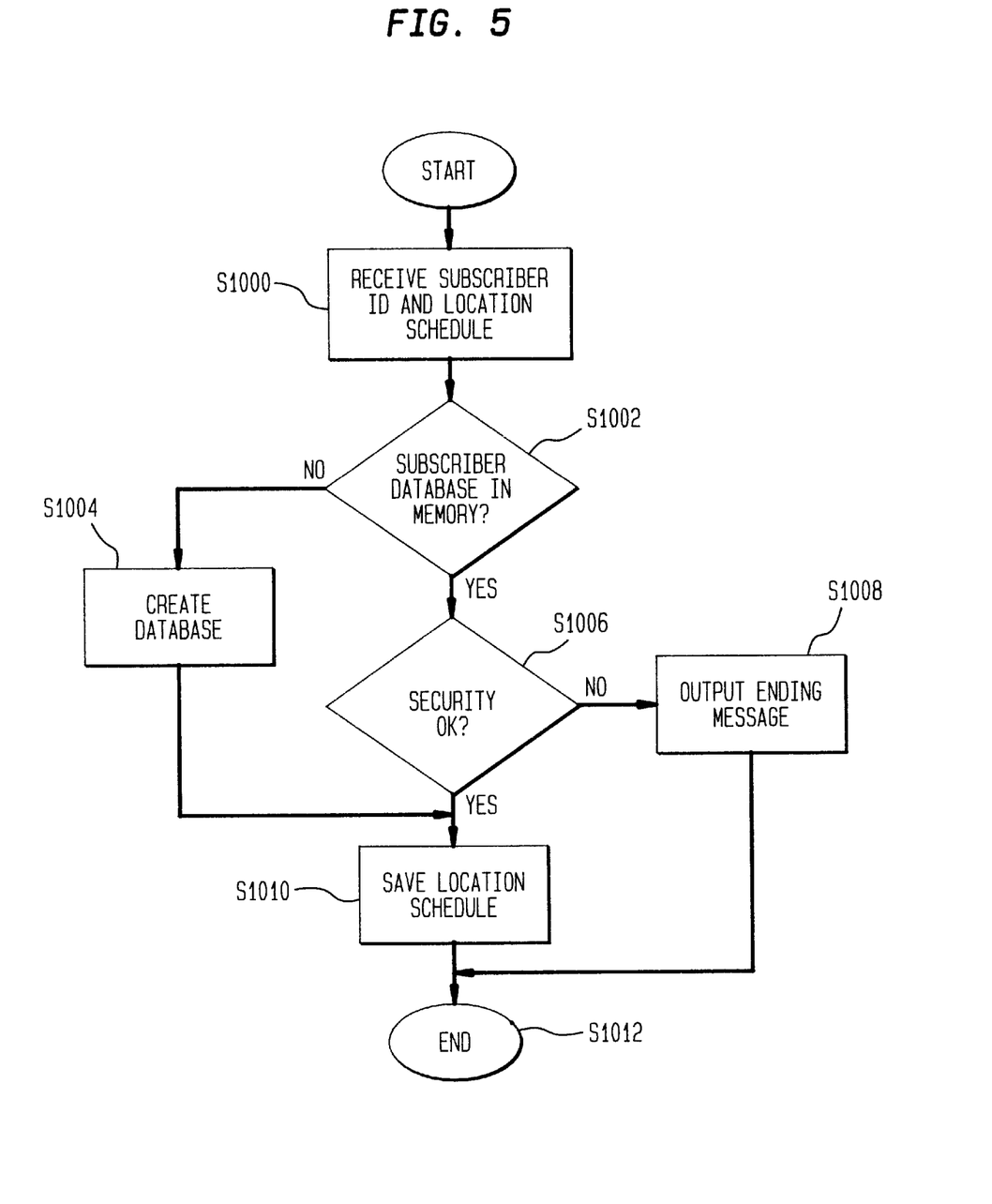
FIG. 5 is a flowchart for entering a location schedule into the mobility system.

FIG. 5 shows a flowchart of the mobile system unit 300 receiving a location schedule from a subscriber. In step S1000, the controller 302 receives a subscriber ID and a location schedule from the subscriber and then goes to step S1002. In step S1002, the controller 302 searches the memory 304 for a database based on the subscriber ID. If a database is found, the controller 302 goes to step S1006. Otherwise, the controller 302 goes to step S1004. In step S1004, the controller 302 creates a database identified by the subscriber ID and then goes to step S1010.

In step S1006, the controller 302 verifies security information based on a password and/or a personal identification number (PIN) entered by the subscriber. If the password and/or PIN is correct, the controller 302 goes to steps S1010. Otherwise, the controller 302 provides the subscriber a preset number of opportunities to enter the correct password and/or PIN. If the subscriber fails to enter a correct password and/or PIN, the controller 302 goes to step S1008.

In step S1008, the controller 302 outputs an ending message and then goes to step S1012 and ends the process. In step S1010, the controller 302 incorporates the location schedule received from the subscriber into the database and stores the database in the memory 304 and then goes to step S1012 and ends the process.

Figure 6:
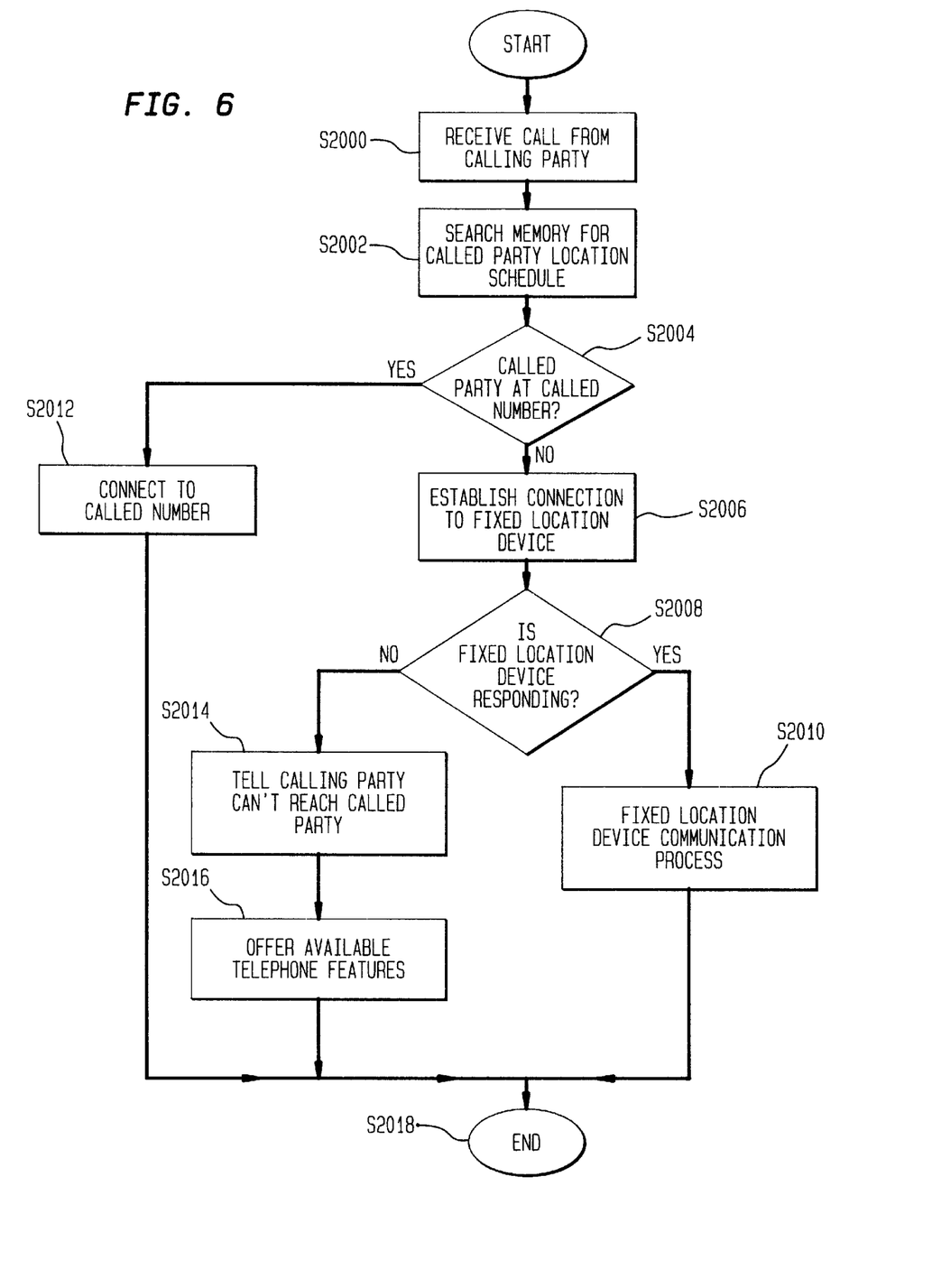
FIG. 6 is a flowchart for connecting a calling party with a called party using the mobility system.

FIG. 6 is a flowchart for receiving a call from a calling party and connecting the calling party with the subscriber or pages the subscriber. In step S2000, the controller 302 receives a call from the calling party and then goes to step S2002. In steps S2002, the controller 302 searches the memory 304 for a location schedule based on the number dialed by the calling party and then goes to step S2004. In step S2004, the controller 302 determines whether the subscriber can be reached at the number dialed by the calling party based on the location schedule. If the subscriber can be reached at the number dialed by the calling party or a location schedule is not found, the controller 302 goes to step S2012. Otherwise, the controller 302 goes to step S2006.

In step S2012, the controller 302 routes the call to the number dialed by the calling party and then goes to step S2018 and ends the process. In step S2006, the controller 302 attempts to reach the subscriber by establishing a connection to the fixed location device 106, for example, indicated by the subscriber's location schedule. Then the controller 302 goes to step S2008.

In step S2008, the controller 302 determines whether the fixed location device 106 responded to the controller 302's connection request. If the fixed location device 106 does not respond to the controller 302's connection request, then the controller 302 goes to step S2014. Otherwise, the controller 304 goes to step S2010. In step S2014, the controller 302 outputs a message to the calling party indicating that the subscriber cannot be reached. Then the controller 302 goes to step S2016. In step S2016, the controller 302 offers to the calling party available telephone features such as leaving a message in a mailbox subscribed to by the subscriber. After the calling party completes the selected features, the controller 302 goes to step S2018 and ends the process. In step S2010, the controller 302 executes a fixed location device communication process. After the fixed location device communication process is completed, the controller 302 goes to step S2018 and ends the process.

Figure 7:
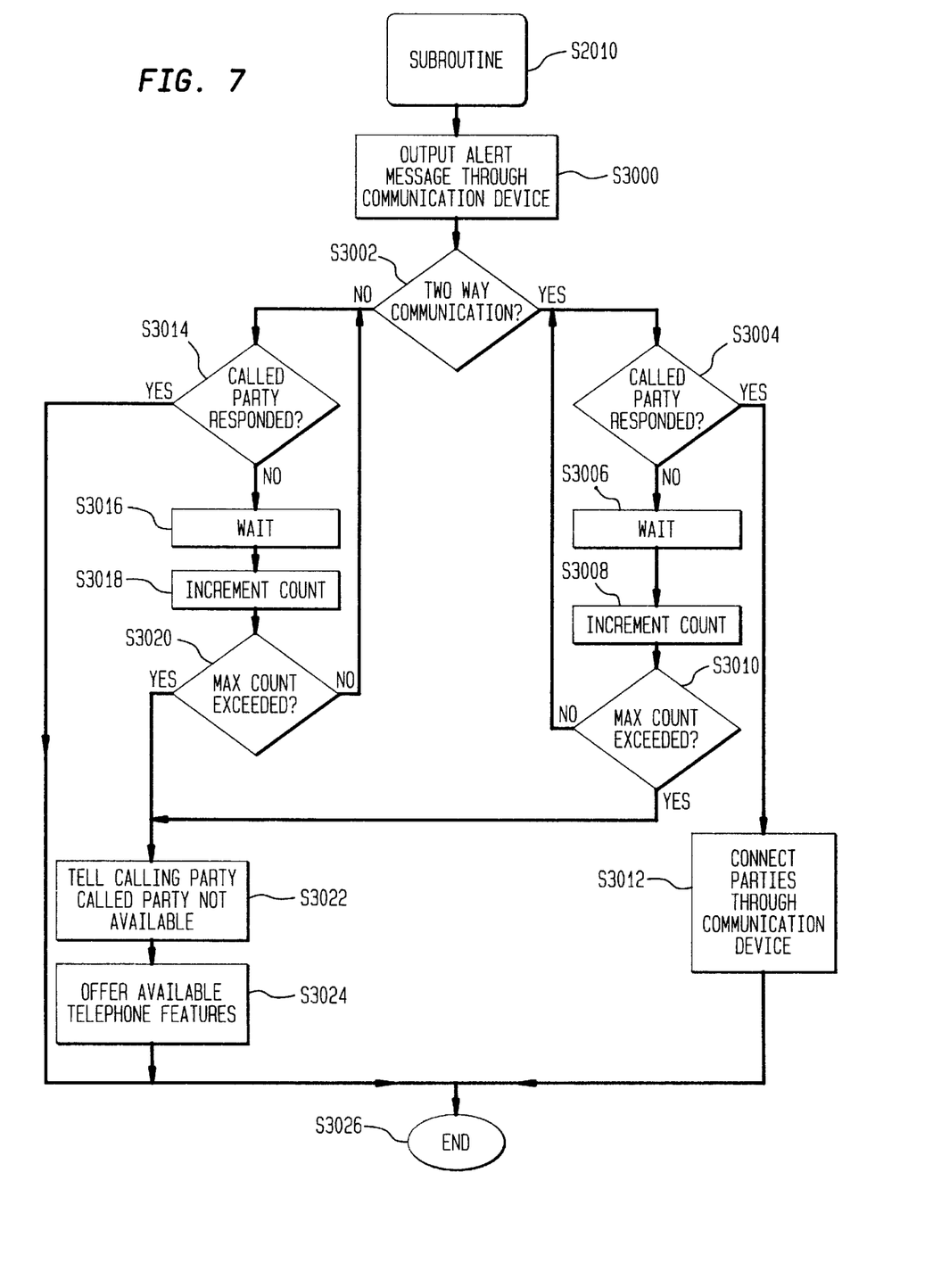
FIG. 7 is a flowchart for connecting a calling party to a called party through a fixed location device.

FIG. 7 is a flowchart showing the fixed location device communication process in greater detail. In step S3000, the controller 302 determines what communication devices are connected to the fixed location device 106 and outputs a page through selected communication devices. The communication devices are selected based on predetermined criteria. Then the controller 302 goes to step S3002. In step S3002, the controller 302 determines whether the selected communication devices are two-way devices or one-way devices. This determination may be made by querying the fixed location device 106. If a selected communication device is a one-way communication device, the controller 302 outputs a page signal through that communication device and goes to step S3014. Otherwise, the controller 302 goes to step S3004. In step S3014, the controller 302 determines whether the subscriber responded to the page. If the subscriber responded to the page by a reverting call or by communicating through a two-way communicating device for example, the controller 302 goes to step S3026 and ends the process.

If the subscriber failed to respond to the page, the controller 302 goes to step S3016 and waits for a predetermined amount of time. Then the controller 302 goes to step S3018 and increments a count and then goes to step S3020. In step S3020, the controller 302 determines whether the count exceeded a maximum. If the count exceeded a maximum, the controller 302 goes to step S3022. Otherwise, the controller 302 returns to step S3014.

In step S3022, the controller 302 outputs a message to a calling party indicating that the subscriber cannot be reached and then goes to step S3024. In step S3024, the controller 302 offers available telephone features subscribed to by the subscriber. When the calling party completes the process of any selected features, the controller 302 goes to step S3026 and ends the process.

In step S3004, the controller 302 determines whether the subscriber responded to the page. If the subscriber responded to the page, the controller 302 goes to step S3012. Otherwise, the controller goes to step S3006 and waits for a predetermined period of time and then goes to step S3008. In step S3008, the controller 302 increments a count and goes to step S3010. In step S3010, the controller 302 determines whether the count exceeded a maximum. If the count exceeded a maximum, the controller 302 goes to step S3022. Otherwise, the controller 302 returns to step S3004.

In step S3012, the controller 302 routes the subscriber to the calling party for two-way communication. Then the controller 302 goes to step S3026 and ends the process leaving the calling party and the subscriber connected through the fixed location device 106.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A method for operation of a mobility communication system, comprising:

receiving a call from a calling party for a called party;

establishing a connection between the mobility communication system and a fixed location device via either a data network or a cable network based on a number dialed by the calling party and a location schedule; and paging the called party through the fixed location device.

2. The method of claim 1, further comprising:

cease paging the called party when the called party makes a reverting call to the calling party.

3. The method of claim 1, further comprising:

retrieving an address of the fixed location device from the location schedule.

4. The method of claim 1, wherein the fixed location device includes a cable box connected to the cable network.

5. The method of claim 1, wherein the fixed location device is coupled to at least one communication device, the at least one communication device being one of a one-way device and a two-way device.

6. The method of claim 5, further comprising:

connecting the called party and the calling party through the two-way device when the called party responds to the page through the two-way device.

7. The method of claim 5, further comprising:

selecting a portion of the at least one communication device to page the called party based on predetermined criteria.

8. The method of claim 7, wherein the predetermined criteria include whether the at least one communication device is turned ON, the two-way device, or capable of sound alerts.

9. The method of claim 5, wherein the at least one communication device includes one of a television system, a stereo system and a mailbox system.

10. The method of claim 1, further comprising:

uploading the location schedule by one of a terminal or a pager.

11. The method of claim 1, wherein the mobility system is a plurality of distributed mobility systems, when the location schedule is entered or updated in one of the plurality of distributed mobility systems, the plurality of distributed mobility systems communicating so that the entered location schedule is available to every one of the plurality of distributed mobility systems.

12. The method of claim 1, further comprising:

updating the location schedule by one of uploading update data to the mobility system via a terminal or a pager.

13. The method of claim 1, wherein the location schedule comprises a list, the list including at least one address.

14. The method of claim 13, wherein the list further includes at least one of a data and a time that corresponds to the at least one address.

15. The method of claim 13, wherein each of the at least one address identifies one of the fixed location device, a terminal, a telephone station, a pager and a cellular phone.

16. A method for operation of a mobility communication system, comprising:

receiving a call from a calling party for a called party;

establishing a connection between the mobility communication system and a fixed location device via either a data network or a cable network based on a number dialed by the calling party and a location schedule; and paging the called party through the fixed location device, wherein the mobility system is a plurality of distributed mobility systems, when the location schedule is entered or updated in one of the plurality of distributed mobility systems, the plurality of distributed mobility systems communicating so that the entered location schedule is available to every one of the plurality of distributed mobility systems.

* * * * *